(12) United States Patent
Patel et al.

(10) Patent No.: US 6,689,421 B2
(45) Date of Patent: Feb. 10, 2004

(54) METHOD OF PREPARING A MICROPOROUS FILM, AND IMAGING METHOD

(75) Inventors: Ranjan C. Patel, Little Hallinbury (GB); Jon C. Vogel, Harlow (GB); Keith P. Parsons, Herts (GB); Graham Spence, Herts (GB); Alan J. Lindsay, Herts (GB); Rachel J. Hobson, Nr. Great Dunmow (GB); Luke C. Williams, Harlow (GB)

(73) Assignee: Kodak Polychrome Graphics, Inc., Norwalk, CT (US)

( * ) Notice: Subject to any disclaimer, the term of this patent is extended or adjusted under 35 U.S.C. 154(b) by 330 days.

(21) Appl. No.: 09/804,417

(22) Filed: Mar. 12, 2001

(65) Prior Publication Data

US 2001/0023014 A1 Sep. 20, 2001

Related U.S. Application Data

(62) Division of application No. 09/255,509, filed on Feb. 22, 1999, now abandoned.

(51) Int. Cl.$^7$ .................................................. B05D 5/00
(52) U.S. Cl. ...................... 427/245; 427/256; 427/336; 427/352; 427/373; 427/385.5
(58) Field of Search ................................ 427/245, 336, 427/352, 373, 385.5, 256

(56) References Cited

U.S. PATENT DOCUMENTS

| | | |
|---|---|---|
| 3,351,495 A | 11/1967 | Larsen et al. |
| 3,729,332 A | 4/1973 | Grubb et al. |
| 3,862,030 A | 1/1975 | Goldberg |
| 3,903,234 A | 9/1975 | Ikeda et al. |
| 3,957,651 A | 5/1976 | Kesting |
| 4,046,843 A | 9/1977 | Sano et al. |
| 4,237,083 A | 12/1980 | Young et al. |
| 4,335,193 A | 6/1982 | Doi et al. |
| 4,460,637 A | 7/1984 | Miyamoto et al. |
| 4,472,328 A | 9/1984 | Sugimoto et al. |
| 4,481,244 A | 11/1984 | Haruta et al. |
| 4,496,629 A | 1/1985 | Haruta et al. |
| 4,585,604 A | 4/1986 | Okuyama et al. |
| 4,613,643 A | 9/1986 | Nakamura et al. |
| 4,780,356 A | 10/1988 | Otouma et al. |
| 4,785,313 A | 11/1988 | Higuma et al. |
| 4,832,984 A | 5/1989 | Hasegawa et al. |
| 4,833,172 A | 5/1989 | Schwarz et al. |
| 4,861,644 A | 8/1989 | Young et al. |
| 4,877,679 A | 10/1989 | Leatherman et al. |
| 4,879,568 A | 11/1989 | Bartky et al. |
| 4,887,100 A | 12/1989 | Michaelis et al. |
| 4,954,395 A | 9/1990 | Hasegawa et al. |
| 5,002,825 A | 3/1991 | Mimura et al. |
| 5,027,131 A | 6/1991 | Hasegawa et al. |
| 5,032,450 A | 7/1991 | Rechlicz et al. |
| 5,059,983 A | 10/1991 | Higuma et al. |
| 5,104,730 A | 4/1992 | Misuda et al. |
| 5,275,867 A | 1/1994 | Misuda et al. |
| 5,326,391 A | 7/1994 | Anderson et al. |
| 5,374,475 A | 12/1994 | Walchli |
| 5,445,868 A | 8/1995 | Harasawa et al. |
| 5,463,178 A | 10/1995 | Suzuki et al. |
| 5,605,750 A | 2/1997 | Romano et al. |
| 5,635,291 A | 6/1997 | Yoshino et al. |
| 5,647,935 A | 7/1997 | Hoshino et al. |
| 5,670,097 A | 9/1997 | Duan et al. |

FOREIGN PATENT DOCUMENTS

| | | |
|---|---|---|
| EP | 0 156 532 B1 | 8/1991 |
| EP | 0 409 440 B1 | 5/1994 |
| EP | 0 555 398 B1 | 9/1994 |
| GB | 856327 | 9/1957 |
| JP | 55-106243 | 8/1980 |
| JP | 63-141610 | 6/1988 |
| JP | 07-018113 | 1/1995 |
| WO | WO 97/20885 | 6/1997 |
| WO | WO 97/29916 | 8/1997 |
| WO | WO 97/33758 | 9/1997 |

*Primary Examiner*—Bernard Pianalto
(74) *Attorney, Agent, or Firm*—Faegre & Benson LLP

(57) ABSTRACT

A method for manufacturing a microporous film comprising the steps of:

(a) providing a first polymer which is a hydrophobic thermoplastic polymer and a second polymer which is a hydrophilic polymer or copolymer of N-vinylpyrrolidone;

(b) dissolving said first and second polymers in a solvent system which is compatible with both polymers, said solvent system comprising a blend of an aprotic organic solvent and an alcohol;

(c) coating the resulting solution on a support;

(d) effecting at least a partial drying of the resulting coating; and (e) washing the coating in an aqueous medium so as to extract at least 50% by weight of the said second polymer.

16 Claims, No Drawings

METHOD OF PREPARING A MICROPOROUS FILM, AND IMAGING METHOD

This is a division of application No. 09/255,509 filed Feb. 22, 1999, abandoned.

FIELD OF THE INVENTION

This invention relates to microporous films and methods of manufacturing thereof, and to image receptors which are particularly suitable for use in ink-jet imaging using either aqueous or nonaqueous inks.

BACKGROUND OF THE ART

Microporous films and membranes are well-known materials, and may be regarded as polymer films in which a significant proportion of the volume of the film comprises microscopic pores and voids. The pores and voids normally connect with each other and with at least one surface of the film. Microporous films find use in a wide range of fields, including filtration, reverse osmosis, battery separators, breathable fabrics, surgical dressings and, when the pores have been filled with a suitable substance, sustained-release systems. Recently, there has been growing interest in the use of microporous films as printable surfaces, and in particular as receptors for ink jet printing.

The manufacture and uses of microporous films are reviewed, for example, in *Synthetic Polymeric Membranes* (R. E. Kesting), McGraw-Hill, 1971, and described in numerous patents.

In a widely-used manufacturing process, a mixture comprising a thermoplastic polymer and a particulate filler and/or a second polymer, which is incompatible with the first polymer, is melt extruded as a heterophasic film, then stretched in at least one direction so as to form voids at the phase boundaries.

This method is described, for example, in U.S. Pat. Nos. 3,903,234; 3,967,978; 4,472,328; 4,585,604; and 4,613,643.

In another widely-used process, a blend of two incompatible polymers, or a mixture of a polymer and a low molecular weight additive, often in combination with a filler, is melt extruded as a film and then washed with a suitable solvent so as to remove one of the polymers or the additive, thereby creating voids in the film. This is described, for example, in U.S. Pat. Nos. 3,351,495; 3,729,332; 3,862,030; 4,237,083; 4,335,193; 5,326,391 and WO 97/20885. A combination of washing and stretching may be employed, e.g., as disclosed in U.S. Pat. Nos. 4,833,172 and 4,861,644.

Methods involving casting of the film from a solution or dispersion are also known. For example, U.S. Pat. No. 5,374,475 and EP 555,398 disclose the formation of microporous films by coating dispersions of polymer microparticles on a support, followed by drying in a manner which does not cause coalescence of the particles. EP 156,532 and U.S. Pat. No. 5,374,475 disclose formation of microporous films by the process known as polymer phase inversion. In this method, a polymer is dissolved in a solvent mixture comprising a good solvent for the polymer and a less-volatile poor solvent for the polymer, then coated on a support and dried. Voids are formed in the resulting film as the residual poor solvent is driven off.

Formation of microporous polyester membranes by "polymer assisted phase inversion" is described in the above-referenced book *Synthetic Polymeric Membranes* and in U.S. Pat. No. 3,957,651. In this process, a polyester derived from an aromatic dibasic acid and an "assisting" polymer are dissolved in a mutual solvent, then coated on a support and dried. The resulting film is washed in a solvent capable of selectively dissolving the assisting polymer, thereby forming voids in the film. Only expensive and/or noxious fluorinated solvents such as hexafluoroisopropanol and trifluoroacetic acid are said to be suitable as the mutual solvent.

There is a growing interest in the use of ink jet printing for the output of high quality images, e.g., of a quality rivalling conventional photographic images. In ink jet printing, tiny droplets (e.g., of a volume measured in picolitres) of colored ink are expelled from an array of nozzles onto a receptor, in accordance with digitally-stored image information. The process may be repeated several times using inks of different colors to build a full color image, and has the potential to provide images of photographic quality in a cost-effective manner using relatively simple apparatus suitable for use in the home or office environment, without the need for light-sensitive materials or the use of processing chemicals. However, the quality and throughput obtainable is largely dependent on the properties of the receptor on which the image is printed. The jetting process generally demands the use of low viscosity inks with a low solids content, and so large volumes of liquid must be absorbed by the receptor, especially in the case of 4-color imaging. The liquid must be absorbed rapidly, to enable successive printing of the different colors without bleeding, and to provide an image that resists smearing, without extended drying times. Furthermore, the ink must not diffuse sideways after contacting the receptor, otherwise the resolution is degraded. Finally, so as to obtain bright, dense images, the dyes or pigments in the ink preferably should be retained at or near the surface of the receptor, but in a manner which does not render the image susceptible to physical damage.

Two techniques are currently employed in the art in pursuit of higher quality images. One is to jet a normal density ink and a low density ink (from separate printheads) so that the number of available grey levels is increased. The second is to jet multiple droplets of ink from a single nozzle into a particular pixel area in order to obtain multiple grey levels. A combination of the two techniques can provide even more grey levels, and hence even higher image quality. However, such techniques place great demands on the image receptor. Even larger volumes of ink must be absorbed, and the rate of absorption must be commensurate with the ever-increasing firing rate of commercial ink jet printheads, otherwise the image-forming process becomes limited by the absorption rate and capacity of the receptor.

Piezoelectric ink jet printheads are most suitable for multiple droplet jetting, owing to the superior control they afford over the droplet size and placement. In particular, the shared-wall type of piezoelectric ink jet printheads, as exemplified by the Xaarjet™ printheads supplied by Xaar Ltd., Cambridge, UK and described in U.S. Pat. Nos. 4,887,100 and 4,879,568, have advantages in this respect. Such printheads are not limited to the use of aqueous inks (which are used by most, if not all, of the commercially-available ink jet printers), and indeed many advantages are to be gained by the use of oil-based inks. These include the ease with which pigmented inks can be designed, since pigmented inks can provide a more accurate and stable color rendition than their dye-based counterparts.

Although a large body of literature exists on the design and manufacture of receptors for ink jet printing, there is still a need for improved receptors, suitable for use in high quality multilevel printing. In particular, Applicants are unaware of any published art addressing the particular demands of multilevel printing using oil-based inks.

In the context of conventional ink jet printing, many patents describe the use of microporous films as receptors. The pores of such materials potentially provide a means of absorbing substantial amounts of liquid, and at the same time channelling it downwards (away from the surface) rather than sideways. Patents disclosing microporous receptors include WO97/29916; WO97/20885; EP 555,398; EP 409,440; EP 156,532; and U.S. Pat. Nos. 3,729,332; 4,460,637; 4,481,244; 4,496,629; 4,780,356; 4,861,644; 5,002,825; 5,104,730; 5,326,391; 5,374,475; 5,445,868; 5,635,291 and 5,647,935. Many patents teach the use of a two-layer system in which an ink-absorbing layer is overlaid by an ink-transporting layer, one or both of said layers being microporous (see, for example, WO97/33758; Japanese Patent Publication Nos. 61-035276; 61-035277; 61-035278 and 05-051470; and U.S. Pat. Nos. 4,785,313; 4,832,984; 4,954,395; 5,027,131; 5,059,983; 5,275,867; 5,374,475; 5,463,178 and 5,605,750. A variety of different microporous layer compositions are disclosed, including many composed predominantly of inorganic materials such as alumina or silica, as in U.S. Pat. Nos. 5,647,935; 5,104,730; 5,002,825; 5,463,178; 5,635,291; 5,445,868; 5,275,867; and 4,780,356. Print-accepting members comprising a microporous poly (vinyl butyral) layer are disclosed in Japanese Published Patent Application Nos. 08-090944 and 58-136479.

The majority of the above-referenced patents refer to aqueous ink jet printing, and few patents describe receptors tailored specifically for nonaqueous inks, although one example is Japanese Published Patent Application JPO8-324095, which discloses an ink jet recording medium comprising a base material, a porous layer with high affinity for nonaqueous solvents, and a transparent top layer which is permeable to the relevant solvents.

A number of microporous materials are marketed as ink jet receptors for use with aqueous inks, including the materials sold under the tradename Teslin™ Microporous Membrane by PPG Industries Inc., Pittsburgh, Pa. The manufacture of this and similar materials is described in several patents, notably U.S. Pat. No. 5,326,391, which refers to a sheet-form microporous material which on a coating-free, printing ink-free and impregnant-free basis comprises: (a) a matrix consisting essentially of substantially water-insoluble thermoplastic organic polymer, (b) finely divided substantially water-insoluble filler particles, of which at least 50% by weight are siliceous particles, the filler particles being distributed throughout the matrix and constituting from 40 to 90% by weight of the microporous material, and (c) a network of interconnecting pores communicating substantially throughout the microporous material, the pores constituting from 35 to 95% by volume of the microporous material. U.S. Pat. No. 4,861,644 describes the utility of such materials as image receptors, including their use in ink jet printing using aqueous inks. There is no mention of multilevel ink jet printing, or of the use of oil-based inks.

U.S. Pat. No. 5,605,750 and WO97/33758 disclose the formation of topcoats consisting (respectively) of boehmite and nonporous poly(N-vinyl pyrrolidone) on Teslin™ Microporous Membrane. The resulting materials show improved properties as receptors for ink jet printing using aqueous inks, giving brighter images of higher density than the unmodified Teslin™ sheet. Again, neither patent mentions multilevel printing or oil-based inks.

Applicants have discovered that unmodified Teslin™ sheet fulfills many of the requirements for high-speed multilevel ink jet printing, in that it has the ability to absorb both aqueous and nonaqueous inks in the necessary volumes and at the necessary rates to give "instant-dry," non-bleeding, well-resolved images. However, the resulting images still show a number of deficiencies. When aqueous inks are used, the images are dull and of low density. When oil-based inks are used, the images have a mottled appearance, which can be traced to the ragged, uneven shape of the individual image pixels, caused by the rough texture of the sheet. With either type of ink, the images are excessively matt in appearance.

There is therefore a need for improved receptors for ink jet printing, capable of giving glossy, high quality images by multilevel printing with both aqueous and nonaqueous inks.

SUMMARY OF THE INVENTION

According to a first aspect of the invention, there is provided a method for manufacturing a microporous film comprising the steps of:

(a) providing a first polymer which is a hydrophobic thermoplastic polymer and a second polymer which is a hydrophilic polymer or copolymer of N-vinylpyrrolidone;

(b) dissolving said first and second polymers in a solvent system which is compatible with both polymers, said solvent system comprising a blend of an aprotic organic solvent and an alcohol, (c) coating the resulting solution on a support;

(d) effecting at least a partial drying of the resulting coating; and (e) washing the coating in an aqueous medium so as to extract at least 50% by weight of the said second polymer.

Optionally, the microporous film may be removed from the support in a subsequent step. Optionally, a finely-divided particulate filler (such as silica) may be dispersed in the solution prior to coating, and optionally one or more low molecular weight additives (such as crosslinkers, hardeners or levelling agents) may be co-dissolved with the polymers in step (b).

"Aprotic organic solvents" are organic solvents which neither release nor accept protons. For the purpose of the invention, this may be regarded as excluding from the invention any solvent whose molecules comprise one or more hydrogen atoms bonded directly to oxygen, sulfur or nitrogen, unless the nitrogen forms part of an amide group.

In a second aspect of the invention there is provided an image accepting member, preferably an ink accepting member, comprising a microporous film made by the above method.

In a third aspect, the invention is an ink accepting member comprising a support which is a sheet-form microporous material which on a coating-free, printing ink-free and impregnant-free basis comprises: (a) a matrix consisting essentially of substantially water-insoluble thermoplastic organic polymer, (b) finely divided substantially water-insoluble filler particles, of which at least 50% by weight are siliceous particles, the filler particles being distributed throughout the matrix and constituting from 40 to 90% by weight of the microporous material, and (c) a network of interconnecting pores communicating substantially throughout the microporous material, the pores constituting from 35 to 95% by volume of the microporous material, the support bearing on at least one side thereof a microporous organic polymer film comprising a network of pores which communicate with the pores in said support. Preferably the microporous organic polymer film is made by the above method.

In a fourth aspect of the invention there is provided an imaging method wherein an ink image is deposited on the image accepting member defined above.

DETAILED DESCRIPTION OF THE PREFERRED EMBODIMENTS

The invention provides a novel and versatile method for the manufacture of microporous films, affording an unprecedented level of control over the physical and chemical properties of the said films, such as the size and distribution of the pores, and their affinities for aqueous and nonaqueous media. The resulting films find particular use as receptors for colorant transfer and ink jet imaging, and may be tailored for use with aqueous or nonaqueous inks, providing images superior in one or more attributes such as gloss, density, smear-resistance and fade-resistance compared to images obtained using prior art receptors.

Image accepting members in accordance with the second aspect of the invention are capable of providing bright, high density, glossy, durable images of high quality by means of multilevel ink jet printing at high speeds (e.g., 2 minutes or less per A4 sheet). Furthermore, they are compatible with both aqueous and oil-based inks.

At the heart of the inventive method lies Applicants' discovery that polymers and copolymers of N-vinylpyrrolidone form microphasic dispersions with a wide range of host polymers when codissolved with them in a particular solvent system, then cast as films from the resulting solutions. Pores of controlled size and uniformity are then created by washing the films in aqueous media, which selectively extracts the N-vinylpyrrolidone polymers.

Polymers and copolymers of N-vinylpyrrolidone appear to be unique in their ability to form microphasic dispersions with a wide range of hydrophobic thermoplastic host polymers when blended with them and cast as films from suitable solvent systems. Attempts to use alternative hydrophilic polymers, such as poly(vinyl alcohol), polyacrylamide, etc., typically result in grossly incompatible mixtures which cannot be cast as coherent films.

The first stage in the process requires the dissolution of two different polymers in a solvent system which is compatible with both polymers, and which comprises a blend of an aprotic organic solvent and an alcohol. "Compatible with both" means that both polymers must be retained in solution or suspension by the solvent system, preferably at a loading of at least 1% solids by weight, as a system which is homogeneous (i.e., clear and non-turbid) at least to the naked eye.

The first polymer is a hydrophobic thermoplastic polymer, and as such has a minimal affinity for water, i.e., it neither dissolves nor swells appreciably in water at ambient or moderately elevated temperatures. It must be soluble in the particular solvent system used, and must be capable of being cast as a film from solution. In particular, it should be readily soluble in the aprotic organic component of the solvent system, but less soluble (preferably insoluble) in the hydroxylic component of the solvent system. As discussed in greater detail below, the aprotic organic solvent is typically a cheap and readily available ketone, ester, ether or hydrocarbon solvent, and so preference is given to polymers which dissolve readily in such media. Thermoplastics which are insoluble in aprotic organic solvents, or soluble only in "exotic" highly polar solvents (e.g., aromatic polyesters such as poly(alkylene terephthalates), and engineering plastics such as aromatic polysulphones, polyetherketones, polyimides, etc.) are not suitable for use in the invention.

Apart from these constraints, there are no particular restrictions on the identity of the first polymer. Thus, it may be selected from a wide range of thermoplastic homopolymers and copolymers (ordered or random), including both addition and step-growth (condensation) polymers. Suitable examples may be selected from a variety of structural classes, including vinyl polymers, acrylate and methacrylate polymers, cellulose esters, polyethers, polyesters, and polycarbonates. Preferred materials include poly(vinyl acetal)s such as poly(vinyl butyral); cellulose acetate butyrate; poly (methyl methacrylate); and vinyl chloride/vinyl acetate copolymers such as those available under the tradenames VAGH™ and VYNS™ from Union Carbide.

Particularly preferred hydrophobic thermoplastics are those comprising a limited number of pendant hydroxyl groups per polymer chain. The pendant hydroxyl groups facilitate crosslinking or hardening reactions, which may be employed to optimize the physical and chemical properties of the final product, as described in greater detail below. Furthermore, the hydroxyl groups may assist in the dispersion of a particulate filler such as silica, which is present in the preferred embodiments of the invention, described in greater detail below. It is also possible that the hydroxyl groups promote hydrogen-bonding or other interactions between the hydrophobic and hydrophilic polymers which favor production of the necessary microphasic dispersion, and may control the rate and extent of extraction of the hydrophilic polymer in the washing step. However, the number of hydroxyl groups per chain should not be so great as to alter the essentially hydrophobic character of the polymer, or to render it highly soluble in the hydroxylic component of the solvent system. A useful indicator of the hydroxyl content of the polymer is its hydroxyl number, which is the weight (in grams) of the polymer equivalent to one mole of hydroxyl groups, and hence a relatively high value indicates a relatively low hydroxyl content, and viceversa. To maintain hydrophobic character, the OH number is preferably not less than 300, more preferably not less than 350. While there is no particular upper limit for the OH number, little benefit is obtained from the very low concentrations of hydroxyl groups corresponding to OH numbers of 1000 or more. Preferred hydroxy-functional polymers include cellulose esters such as cellulose acetate butyrate, which are prepared by esterification of cellulose, but typically comprise an average of 0.2–0.5 unreacted OH groups per repeating unit; and poly(vinyl acetal)s such as poly(vinyl formal) and poly(vinyl butyral), which are prepared by reacting poly(vinyl alcohol) with an aldehyde, but which invariably comprise unreacted OH groups. A particularly preferred material is Butvar™ B76 (supplied by Solutia, formerly Monsanto) which is nominally poly(vinyl butyral), but comprises approximately 12 wt % unreacted poly(vinyl alcohol).

The second polymer is a hydrophilic polymer or copolymer of N-vinylpyrrolidone, and therefore shows a high affinity for water, i.e., it should swell on contact with water, and preferably should be soluble in water. At the very least, it must be soluble in aqueous organic mixtures (e.g., aqueous ethanol) to enable it to be selectively extracted from the coating without dissolving or swelling the first polymer. Most preferably, the second polymer is soluble in pure water. Preferred materials are homopolymers of N-vinylpyrrolidone or copolymers of N-vinylpyrrolidone and vinyl acetate comprising up to 50% by weight vinyl acetate. Homopolymers of N-vinylpyrrolidone are available in a variety of molecular weights from International Specialty Products (ISP) (Wayne, NJ) under the tradenames K-15, K-30, K-60, K-80, K-90 and K-120. Homopolymers of different molecular weights give rise to different pore sizes and distributions in the final product, with higher molecular weights generally leading to larger numbers of smaller pores, with a more uniform size distribution. Thus, for the preparation of ink jet receptors, relatively high molecular weights (greater than 100,000, preferably greater than 200,000, most preferably greater than 300,000, e.g., 630,000 as in the K-90 product) are preferred. However, the most preferred material is a copolymer comprising 70% N-vinylpyrrolidone and 30% vinyl acetate by weight, available as a 50 wt % solution in ethanol from International Specialty Products (ISP) (Wayne, N.J.) under the tradename GAF E735™.

The relative proportions of the first and second polymers may vary widely, depending on the identity of the materials involved and the degree or type of porosity desired in the final product. Most commonly, however, the weight ratio of the first and second polymers is in the range 2:1–1:3. In the preferred embodiments, where the first and second polymers are (respectively) Butvar™ B-76 and GAF E735™, weight ratios of 1:1 or less (and preferably about 1:2) are found to lead to a high density of pores of average diameter less than 1 $\mu$m, which is desirable for image receptor applications.

The solvent system in which the first and second polymers are co-dissolved comprises an aprotic organic solvent and an alcohol. Depending on the choice of polymers, the aprotic organic solvent may be selected from a wide variety of organic solvents, but preference is given to the cheaper, readily-available solvents having a boiling point of less than 120° C. at normal atmospheric pressure, preferably less than 100° C. These include ketones, such as acetone, methyl ethyl ketone (MEK), cyclohexanone etc.; ethers, such as diisobutyl ether, tetrahydrofuran, dioxan, glycol ethers, etc.; esters, such as ethyl acetate and propyl acetate; and hydrocarbons, such as hexane, toluene, etc., Chlorinated hydrocarbons may also be used (e.g., chloroform, dichloroethane, etc.), but are less preferred for environmental reasons and on grounds of cost. Mixtures of two or more aprotic organic solvents may be used, if desired. The aprotic organic solvent should be a good solvent for the first polymer (i.e., the hydrophobic thermoplastic polymer). In the preferred embodiments of the invention, best results are obtained when MEK is used as the aprotic solvent.

The other essential component of the solvent system, namely the alcohol, must be miscible with the aprotic organic solvent, and should be a good solvent for the second polymer (i.e., the polymer or copolymer of N-vinylpyrrolidone). Preferably, the alcohol is of similar volatility to the aprotic organic solvent. Most commonly the alcohol is a lower alcohol, such as methanol, ethanol, 1-propanol, 2-propanol etc. Ethanol is a particularly preferred example. Mixtures of two or more alcohols may be used, and water may also be present. For example, it is quite acceptable to use commercial grades of ethanol which typically comprise several wt % of water, and are typically denatured with about 5 wt % of other alcohols, such as methanol and 2-propanol.

The relative proportions of aprotic solvent and alcohol may vary depending on the identities of the solvents and of the polymers, and with the microstructure required in the final product. A notable feature of the invention is the ability to vary the size and number of pores formed from a given polymer blend by varying the relative proportions of the aprotic solvent and alcohol(s) used to dissolve the polymer blend. Typically, the weight ratio of aprotic solvent to alcohol is in the range 30:1 to 1:2, more commonly in the range 20:1 to 1:1. In the case of the preferred embodiments, where the first and second polymers are (respectively) Butvar™ B-76 and GAF E735™, increasing proportions of aprotic solvent lead to smaller pores, while increasing proportions of alcohol lead to larger pores. In the preferred embodiments of the invention, the weight ratio of MEK to ethanol is in the range 5:1 to 2:1, more preferably about 3:1. Use of pure ethanol or pure MEK as the solvent leads to a mainly non-porous film.

In a typical procedure, the first polymer is dissolved in the aprotic organic solvent, the second polymer is dissolved in the alcohol, and the two solutions are mixed. Prior to coating on a suitable substrate, further quantities of one or both of the solvents may be added for final adjustment of the aprotic/hydroxylic ratio, or for adjustment of the solids content (and hence viscosity) of the coating solution. The substrate is typically a flexible, self-supporting sheet-form material such as resin-coated paper, aluminium foil or plastic film. A preferred substrate is polyester film of about 25–250 $\mu$m thickness. If necessary, it may comprise subbing layers, or be corona treated, to increase the adhesion of the coating. Alternatively, it may comprise a release layer to facilitate subsequent removal of the coating, if this is desired. The substrate may itself be microporous. For the purposes of this embodiment of the invention, a nonporous support (such as polyester film) bearing a microporous coating prepared by any method known in the art may be regarded as a microporous substrate. Image accepting members comprising a microporous organic polymer film on a microporous support of a particular defined type constitute a separate aspect of the invention, as described in greater detail hereinafter.

Any known coating method may be used, such as slot coating, knife coating, bar coating, roller coating, etc. The coating weight may vary depending on the intended end use, but is typically consistent with a dried coating thickness in the range 5 to 100 $\mu$m.

The next step is drying of the coating. As a result of solvent evaporation, the coating solidifies in the form of a film which appears clear and homogeneous to the naked eye. However, subsequent aqueous extractive treatment reveals it to be phase-separated on a microscopic scale. It is not clear whether the phase separation takes place during the drying process or at an earlier stage, but both these mechanisms are within the scope of the invention. In the practice of the invention, drying must proceed at least to the point at which the coating solidifies, but it is not necessary to remove all traces of solvent before the washing step, especially if washing is carried out in-line, in which case there is less risk of physically damaging the coating while it remains relatively soft.

Optimum drying conditions may vary widely depending on the materials used, and may be established by routine experimentation, but generally speaking, drying (at least initially) at ambient temperatures or at moderately elevated temperatures (e.g., less than 50° C.) is preferred.

The final step in the process according to the invention is washing of the coating in an aqueous medium so as to extract at least 50% by weight of the hydrophilic polymer, and thereby render the coating microporous. For a given loading of hydrophilic polymer in the initial coating, the degree of porosity of the final product is determined by the proportion of the hydrophilic polymer that is removed by the wash. Preferably, at least 75% by weight of the hydrophilic polymer is removed, more preferably at least 85% by weight.

The wash preferably uses plain water at ambient temperature, but higher temperatures and/or aqueous-organic mixtures may be employed to obtain a more rapid or complete extraction, as long as the hydrophobic polymer component does not dissolve or swell appreciably under those conditions. If surfactants are added to the aqueous wash medium, they may deposit on the interior surface of the pores that are formed, and modify the wettability thereof. Similarly, functional materials such as mordents, UV absorbers, antioxidants, etc., may be deposited in the pores from the wash medium. Washing may be carried out by any suitable means, such as spraying or immersion, optionally with agitation, and is conveniently carried out using apparatus of the type used for the processing of photographic film. The washed coating may be dried at ambient or moderately elevated temperature, and is then ready for use.

When the coating (prior to washing) comprises a 1:2 w/w mixture of Butvar™ B-76 and GAF E735™, washing in distilled water for 30 seconds or more at ambient temperature or below results in a maximum weight loss of about 60 wt %, indicating that about 10% by weight of the GAF E735™ remains in the coating.

In a variant of the above-described process, the solution of hydrophobic and hydrophilic polymers in the prescribed blend of solvents is coated on a temporary carrier, dried, laminated to a desired substrate, and the temporary carrier peeled off and discarded. Thereafter, washing the coating in an aqueous medium provides a microporous film attached to the desired substrate. This method may be advantageous in the situation where the desired substrate is highly porous, and direct solvent coating thereof might result in unwanted filling of its pores.

Various additives may be incorporated in the microporous films prepared in accordance with the invention, such as particulate fillers, chemical modifiers (including crosslinkers and hardeners) and fluorocarbon- or silicone-based levelling agents. One or more of such ingredients may be used to optimize the properties of the film for particular end uses.

Particulate fillers, especially silica-based fillers and/or alumina-based fillers, may advantageously be incorporated in microporous films intended for use in ink jet imaging (with either aqueous or nonaqueous inks). Siliceous fillers are particularly effective absorbers of the liquid solvents or dispersants found in the relevant aqueous or nonaqueous inks. Suitable materials include fumed silica, precipitated silica and calcium silicate, including the materials commercially-available under the trade names Aerosil OX50™ and Extrusil™ (Degussa), and Syloid ED74™ (W. R. Grace, N.Y.). The average particle size of such materials is preferably less than 1.0 $\mu$m, more preferably less than 0.5 $\mu$m, and most preferably less than 0.1 $\mu$m. The loading is preferably in the range of from 5 to 40 wt % of the first (hydrophobic) polymer. The siliceous filler is typically added to the solution of the first (hydrophobic) polymer in the aprotic organic solvent and subjected to conventional milling treatments to reduce the particle size (if necessary), prior to mixing with the solution of the hydrophilic polymer in the alcohol. Conventional dispersing aids such as Disperbyk™ 161 (available from Byk Chemie) may be added prior to milling to improve the quality of the dispersion.

Alumina-based fillers (especially boehmite) find particular use in films intended for use in aqueous ink jet imaging, where it is believed that they act as mordents for the dyes commonly used in aqueous inks. A preferred material is Cerasol CD™, supplied by Alcan Chemicals. It may be co-dispersed with the siliceous filler, and/or may be coated separately on top of the microporous film as an aqueous dispersion.

When the hydrophobic polymer has suitable reactive pendant groups, especially hydroxyl groups, a chemical modifier such as a hardener or crosslinking agent may advantageously be added to the formulation. It is preferably added to the solution of the hydrophobic polymer in the aprotic solvent prior to admixture of the solution of the second polymer in the alcohol. The quantity of any crosslinking agent should not be so great as to cause gelling of the solution prior to coating. Chemical modifiers suitable for use with the preferred hydroxy-functional hydrophobic polymers (such as Butvar B76™) include isocyanates, acid chlorides, active esters and the like, especially polyfunctional derivatives thereof, but isocyanates are preferred, as no by-products are formed during the relevant reactions. Suitable isocyanates include 4,4'-methylenebis(phenyl isocyanate), hexamethylene diisocyanate, toluene diisocyanate and the like, and are preferably added to the extent of 0.05–0.5 wt % of the hydrophobic polymer, preferably together with dibutyl tin dilaurate or a similar catalyst.

The use of a modifier such as a polyfunctional isocyanate provides another means of controlling the pore size in the final film, with increasing amounts of modifier leading to smaller diameter pores. The resulting films are also harder, more abrasion resistant, and thermally stable, which is particularly important for use as receptors in thermal transfer imaging, where softening or melting of the film during the imaging process is undesirable. The use of chemical modifiers also improves the performance of the films as receptors in aqueous ink jet imaging, but not in solvent-based ink jet imaging. It is believed that for good results with nonaqueous inks, the polymeric film must absorb substantial quantities of the ink solvent (with concomitant swelling), and that crosslinking or excessive hardening hinders this process.

As an alternative to irreversible chemical hardening and crosslinking by additives such as the isocyanates described above, reversible "physical" crosslinking or hardening of the films may be effected by incorporation of additives capable of ionic or dipolar interactions (e.g., hydrogen bonded interactions) with the polymer chains. This results in a microporous film of increased durability and abrasion resistance, but which retains the ability to swell on contact with nonaqueous inks, and hence is particularly well suited to nonaqueous ink jet imaging applications. Preferred additives of this type, suitable for use in Butvar B76™ based films, are of the following general formula:

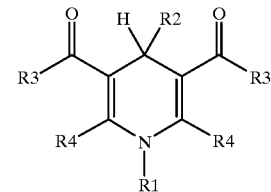

in which
R1 represents hydrogen, an alkyl group, a cycloalkyl group or an aryl group;
R2 represents an alkyl group, a cycloalkyl group or an aryl group;
each R3 represents an alkyl group or an alkoxy group; and
each R4 represents hydrogen, an alkyl group or an aryl group.

In preferred embodiments, R1 represents hydrogen; R2 represents an aryl group such as phenyl, tolyl, 3,4-dihydroxyphenyl, etc.; each R3 represents an alkyl or alkoxy group of up to 5 carbon atoms such as methyl, ethyl, butyl, methoxy, ethoxy, isopropoxy, etc.; and each R4 represents an alkyl group of up to 5 carbon atoms such as methyl, ethyl, etc.

A particularly preferred compound of this type is:

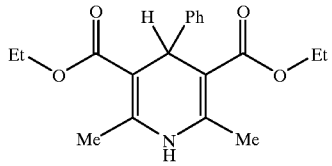

(1)

whose preparation is described in *J. Med. Chem.* (1974), 17(9), 956–65.

The mechanism by which compound (1) and similar species interact with polymers such as Butvar B76™ is not well understood, but is believed to involve hydrogen bonding. They are typically added to the formulation in the range of about 1–10 wt % of the Butvar B76™ or similar polymer, preferably about 3–5 wt %.

Other additives behaving similarly to Compound (1) include α-D-glucose pentaacetate and diethyl terephthalate.

Other additives which may usefully be incorporated in the microporous films include surfactants, levelling agents, UV absorbers, antioxidants, free radical scavengers and mordents, all of which are materials known in the prior art. UV absorbers, antioxidants, free radical scavengers and mordents may improve the light-fastness and/or substantivity of colorants (especially dyes) subsequently deposited on the films. Typical UV absorbers include benzotriazoles and o-hydroxybenzophenones, typical antioxidants include hindered phenols and phenidone, typical radical scavengers include hindered tertiary amines, and typical mordents include quaternarized vinylpyridine polymers. Such materials may be added to the solution prior to coating, typically at loadings of up to 3 wt % of the Butvar B76™ or similar polymer.

The use of levelling agents, particularly silicone- or fluorocarbon-based levelling agents, produces smoother coatings and glossier films. Preferred materials include N-methyl perfluorooctanesulfonamide (at a loading of up to 10 wt % of the Butvar B76™ or similar polymer), and EFKA-30 and EFKA-3032 (at a loading of about 1 wt %). (EFKA-30 and EFKA-3032 are organosiloxane-based coating aids supplied by EFKA Chemicals.)

High surface gloss is a desirable attribute in ink jet receptors, but the microporous receptors of the prior art generally suffer from a matt appearance. It is a particular advantage of the present invention that it can provide microporous receptors that combine all the advantages of microporosity (such as shorter drying times and reduced image spread) with a relatively high degree of surface gloss, comparable to that shown by nonporous receptors. While the use of the aforesaid levelling agents is important in obtaining high gloss values, control over the size and uniformity of the pores, and over the particle size of any filler present, is equally important.

The microporous films made by the process of this invention are particularly suitable for use in imaging processes involving the deposition of one or more colorants on selected areas of the microporous film. The colorants typically comprise one or more dyes or pigments, which most commonly (but not necessarily) are dissolved or dispersed in a binder or a liquid carrier. The dyes or pigments may be chosen on the basis of their ability to absorb radiation of selected wavelengths (e.g., in the UV, visible or infrared regions), or for other physical properties, such as electrical conductivity, magnetic properties, etc. The colorants may be deposited on the film by any conventional means, including pens, pencils, crayons, typographic printing, planographic printing, intaglio printing, screen printing, electrophotographic printing, and thermal transfer imaging. However, the benefits of the invention are realized most fully when the colorants are deposited by ink jet printing.

Ink accepting members in accordance with the third aspect of the invention comprise a support which is typically an opaque, white, microporous sheet form material comprising: (a) a matrix of thermoplastic organic polymer; (b) a large proportion of finely divided water-insoluble siliceous filler; and (c) interconnecting pores. More specifically, the support comprises: (a) a matrix consisting essentially of substantially water-insoluble thermoplastic organic polymer, (b) finely divided substantially water-insoluble filler particles, of which at least 50% by weight are siliceous particles, the filler particles being distributed throughout the matrix and constituting from 40 to 90% by weight of the microporous material, and (c) a network of interconnecting pores communicating substantially throughout the microporous material, the pores constituting from 35 to 95% by volume of the microporous material. The manufacture of such materials is described in U.S. Pat. Nos. 5,326,391 and 4,861,644, the disclosures of which are incorporated herein by reference.

A preferred support for use in this aspect of the invention comprises the microporous material supplied commercially by PPG Industries Inc., Pittsburgh, under the tradename Teslin™. Such materials are typically supplied in the form of a self-supporting sheet or web (e.g., of thickness 150–360 μm), and may be used without further modification as the support in the manufacture of the image accepting members of the invention. If desired, however, one side of the Teslin™ sheet or equivalent material may be adhered to an auxiliary support such as paper, card, polyester film, etc., as described in U.S. Pat. No. 5,605,750.

Alternatively, a coating of adhesive (such as a hotmelt adhesive or a pressure-sensitive adhesive) may be deposited on one side of the Teslin™ sheet or equivalent material, enabling the sheet subsequently to be adhered to any desired surface.

The support carries on at least one of its major surfaces a microporous organic polymer film. When unmodified Teslin™ sheet or similar material is used as the support, both sides may have deposited thereon a microporous organic polymer film. The microporous organic polymer film preferably has a thickness in the range 5 to 100 μm, most preferably from about 20 to 80 μm, and has a porosity in the range 30 to 80% by volume, most preferably from 50 to 70% by volume. The average pore size is preferably in the range 0.2–2.0 μm, and the pore density preferably in the range $10^4$–$10^7$ pores/mm$^2$, most preferably about $10^6$ pores/mm$^2$. Best results are obtained when the distribution of pore sizes is such that a major proportion of the pores are less than 1.0 μm in diameter, but a minor proportion of the pores have diameters greater than this, e.g., in the range 1.5–2.5 μm. It is believed that the smaller pores enable the dyes and pigments of inks to be retained close to the surface of the film, whereas the larger pores facilitate rapid draining of the carrier fluid into the porous support.

In principle, the microporous organic polymer film may comprise any organic polymeric material capable of being fabricated as a microporous film. In practice, preference is given to materials which (prior to being formed into microporous films) are hydrophobic thermoplastics. (However, in the course of being fabricated as microporous films, the polymers may become crosslinked and/or acquire a degree of hydrophilic character.) Polymers with a high affinity for the solvents used in oil-based inks are particularly preferred. Said solvents typically comprise high boiling hydrocarbons, glycol ethers, glycol esters, alkyl esters, long chain alcohols, and the like, including mixtures of two or more of such species, and preferred polymers are those which swell and/or dissolve in such media. Examples of suitable polymers include acrylics, such as poly(methyl methacrylate), cellulose esters, such as cellulose acetate butyrate, and vinyl polymers, such as poly(vinyl acetal)s and vinyl chloride/vinyl acetate copolymers. Particularly preferred materials include the grade of poly(vinyl butyral) supplied by Solutia (formerly Monsanto) under the tradename Butvar™ B-76, and the vinyl chloride/vinyl acetate copolymers supplied by Union Carbide under the tradenames Vinylite™ VYNS and Vinylite™ VAGH.

In principle, the microporous organic polymer film may be formed on the support by any method known in the art, provided the method of fabrication does not prevent the pores of the microporous organic film from communicating with the pores already present in the support. Thus, for example, bonding a pre-formed microporous film to the support by means of a layer of adhesive would not be a suitable manufacturing method. The preferred method, however, is the method described above in relation to the first aspect of the invention.

Various additives may be incorporated in the microporous organic polymer film, such as the chemical modifiers (including crosslinkers and hardeners) and fluorocarbon- or silicone-based levelling agents described above. The manufacturing process described above readily accommodates the incorporation of such additives, one or more of which may be used to optimize the properties of the film for particular end uses. However, the incorporation of particulate fillers, such as silica-based fillers and/or alumina-based fillers, is not preferred in this aspect of the invention.

The ink receiving element of the third embodiment of this invention is useful in any ink receiving process, but is especially useful for ink jet printing. "Ink" as used herein means a colorant (e.g., dye or pigment) dispersed in a fluid or liquid carrier.

Suitable ink jet printers include those employing solid, phase-change inks, such as Tektronix Phaser™ printers, those employing aqueous inks, such as the Epson Photo Stylus™ printer, the Epson Stylus™ 800 printer, the HP Photosmart™ printer and the HP Deskjet™ 870 printer, as well as those employing nonaqueous inks. Image accepting members in accordance with the invention are particularly suited to high quality multilevel ink jet printing, wherein multiple droplets of ink of a given color are jetted on individual pixel areas, and/or normal density and low-density inks of the same color are jetted from separate printheads. Printers suitable for this type of imaging include those equipped with piezoelectric shared-wall printheads as described, for example, in U.S. Pat. Nos. 4,887,100 and 4,879,568, and exemplified by the Xaarjet™ printheads available from Xaar Ltd, Cambridge, UK.

A surprising feature of the microporous films prepared by the method of the invention, and of the image accepting members in accordance with the invention, is their high affinity for both aqueous and nonaqueous inks. With both types of ink, they show improvements in one or more attributes such as gloss, image density, resolution, drying time and image durability, compared to currently-available ink jet receptors (microporous or otherwise). Particularly striking is their apparent ability to retain the dyes and pigments from the inks at or near the surface of the microporous organic polymer film, and at the same time protect the said dyes and pigments against damage or removal by rubbing or wiping, even under wet conditions.

The brightness and sharpness of ink-jetted images are greatly enhanced when the colorants constituting the image are retained near the surface of the image accepting member. However, this is frequently at the expense of the durability of the image, since the dyes and pigments are susceptible to physical removal or displacement. Thus, many ink jet receptors of the prior art provide images which, although bright and sharp initially, have a poor resistance to smearing or pick-off, especially under damp conditions. Certain other ink jet receptors of the prior art are designed so that the ink is transported away from the surface and held in an underlayer. While this provides a well-protected image, its brightness and sharpness are inevitably degraded.

The mechanism by which the image accepting members of the invention retain and protect the image near the surface is not well understood, but the ability of the microporous organic polymer film to swell or distort on contact with the ink solvent is believed to be important. One possibility is that the colorant is held in micropores near the surface, but swelling of the polymer matrix causes collapse of these pores and effectively encapsulates the colorant. In the case of imaging with nonaqueous inks, evidence has been found for the formation of microscopic pits or depressions on the surface of the film where droplets of ink have been deposited. In such situations, the pigment resides at the bottom of the pits or depressions, and thus enjoys a degree of protection from smearing or other mechanical damage.

Microporous organic polymer films, and, in particular, microporous poly(vinyl butyral) films, have the desirable property of swelling or distorting on contact with the solvents (both aqueous and nonaqueous) used in commercially available inks. The behavior towards aqueous inks is particularly surprising, given that poly(vinyl butyral) is normally regarded as a hydrophobic polymer. However, most aqueous inks contain water-miscible organic solvents, such as glycols, alcohols, etc., in addition to water, and such materials may have a high affinity for poly(vinyl butyral). Furthermore, if the microporous films are prepared by the method described earlier herein, they are likely to contain residual amounts of a hydrophilic polymer or copolymer of N-vinyl pyrrolidone, whose presence may promote the desired interactions.

The invention is illustrated by the following non-limiting examples.

EXAMPLES

The following is an explanation of tradenames and abbreviations used in the Examples:

| | |
|---|---|
| Butvar ™ B-76 | poly(vinyl butyral), supplied by Solutia |
| GAF E735 ™ | N-vinyl pyrrolidone/vinyl acetate copolymer, 70/30 w/w supplied as 50% w/w solution in ethanol by International Specialty Products Inc., Wayne, NJ. |
| VYNS ™ | vinyl chloride/vinyl acetate copolymer, supplied by Union Carbide |
| CAB 381-20 | cellulose acetate butyrate, supplied by Eastman Kodak |
| Syloid ™ ED74 | silica powder, supplied by W. R. Grace |
| Aerosil ™ OX50 | silica powder, supplied by Degussa |

| | |
|---|---|
| Disperbyk™ 161 | dispersing aid, supplied by Byk Chemie |
| Exxsol™ D 140 | aliphatic hydrocarbon, supplied by Exxon |
| Novol™ | oleyl alcohol, supplied by Croda Inc. |
| Teslin™ | microporous, silica-filled polyolefin sheet, supplied by PPG Industries Inc. |
| EFKA-30 | silicone-based coating aid, supplied by EFKA Chemicals |
| NVP | N-vinyl pyrrolidone |
| VA | vinyl acetate |
| PMMA | poly(methyl methacrylate) |
| MEK | methyl ethyl ketone (2-butanone) |
| PET | Melinex™ ST535, white (vesicular) polyester film (primed), supplied by ICI |
| SEM | scanning electron microscopy |
| Compound (1) | structure as shown above, prepared by the method disclosed in J.Med.Chem.(1974), 17(9), 956–65 |

Example 1

A solution of Butvar™ B-76 (2.5 g) and GAF E735™ (5.0 g) in MEK (42.5 g) was prepared and coated on PET using a wire wound bar at 36 μm wet thickness, then dried at ambient temperature to yield a clear film approximately 3.5 μm thick (coating A). Because GAF E735™ comprises 50% by weight ethanol, the coating solution contained equal weights of Butvar™ B-76 and NVP polymer, and the MEK:EtOH ratio was 17:1 by weight.

Coatings B and C were similarly prepared, respectively, from Butvar™ B-76 (5 g) dissolved in MEK (45 g), and GAF E735™ (10 g) dissolved in MEK (40 g).

A sample of coating A was immersed in cold water for 5 minutes, then left to dry, giving coating D. Coating D was hazy in appearance, whereas A–C were clear, and microscopic analysis of D showed large numbers of pores approximately 1.0–1.5 μm in diameter.

Samples of A–D were printed with an identical pattern of text using an Epson Stylus 820™ ink jet printer and the water-based black ink supplied with it, and the imaging characteristics compared. Coating D (invention) gave an image of excellent resolution which was dry to the touch within seconds, whereas the images on coatings A–C (controls) took several minutes to dry, and were of inferior resolution. In particular, the image on coating C was severely distorted by lateral spreading.

Heating of the imaged sample of coating D at 100° C. for a few seconds sealed the image and rendered the coating transparent. The sealed image survived immersion in water.

Example 2

This example illustrates the effect of varying the proportions of aprotic solvent and alcohol.

A series of solutions were prepared of Butvar™ B-76 and GAF E735™ in mixtures of MEK and ethanol. The total solids content was kept constant (7.3 wt %), as was the ratio of hydrophobic polymer to hydrophilic polymer (2:1 by weight), but the relative proportions of MEK and ethanol were varied. The solutions were coated as in Example 1, dried 3 minutes at 60° C., and washed for 30 sec in distilled water at 15° C. The resulting coatings were then examined by SEM and the average pore size recorded:

| MEK/EtOH Ratio (w/w) | Av. Pore Diameter (μm) |
|---|---|
| 3:1 | approx 1.0 |
| 1:1 | approx 80 |
| 1:3 | approx 100 |
| pure EtOH (c) | nonporous |

(c) - control, not in accordance with the invention

Coatings prepared from solutions with a relatively low ethanol content showed large numbers of small pores, of the order of 1 μm in diameter, but as the ethanol content was raised, smaller numbers of larger pores were observed. When pure ethanol was used as solvent, the two polymers apparently formed a homogeneous blend, since little or no pore formation was observed on washing the coating.

Example 3

This example illustrates the effect of varying the relative proportions of hydrophobic and hydrophilic polymers.

A series of coatings were made in which the weight ratio of hydrophobic polymer to hydrophilic polymer varied in the range 2:1 to 1:3. Solutions were prepared with varying amounts of Butvar™ B-76 and GAF E735™ and sufficient quantities of MEK and additional ethanol to provide a constant total solids content (20 wt %) and a constant MEK/EtOH ratio (3:1 by weight). The solutions were knife-coated on PET at 150 μm wet thickness, dried for 3 minutes at 50° C. to give clear films of ca. 30 μm thickness, then washed for 15 sec in distilled water at 15° C. to form microporous films. SEM analysis revealed that following trend in pore size:

| Hydrophobic/Hydrophilic ratio (*) | Av. Pore diameter (μm) |
|---|---|
| 2:1 | <0.1 |
| 1:1 | approx. 0.1 |
| 1:2 | approx. 0.7 |
| 1:3 | approx. 2.0 |

(*) - weight ratio of hydrophobic polymer to hydrophilic polymer

A test pattern was printed on each of the microporous coatings using the Epson Stylus 820™ ink jet printer and the water-based black ink supplied with it, and the dry time and image quality monitored. The 2:1 coating (0.7 μm pores) gave the fastest drying (<30 sec) and the best resolution. The coatings with smaller pores could not absorb the ink quickly enough, and flooded, while the coating with larger pores gave image spreading.

An identical trend was seen when the coatings were printed using a Codent 180 dpi shared wall piezoelectric industrial ink jet printer and an oil-based black ink.

Clearly, by adjusting the weight ratio of hydrophobic polymer to hydrophilic polymer, it is possible to control the pore size of the microporous film formed, and hence its ink-accepting properties.

Example 4

This example illustrates the use of different polymers and copolymers of N-vinyl pyrrolidone as the hydrophilic polymer.

A stock solution was prepared by combining Butvar™ B-76 (6 g) Syloid™ ED74 (2 g) and MEK (32 g), and processing for 4 hours in a McCrone Micronising Mill to reduce the particle size of the silica to below 1 μm. Aliquots of the resulting dispersion were combined with further Butvar™ B-76, further MEK, a test polymer (as a 50% w/w solution in ethanol) and further ethanol to provide a series of formulations, each of 22.4% by weight total solids, and each containing MEK and ethanol in the ratio 3:1 by weight. The test polymers were copolymers of N-vinyl pyrrolidone (NVP) and vinyl acetate (VA) of varying composition, and homopolymers of N-vinyl pyrrolidone having a range of molecular weights. Specifically, the following were tested:

| | |
|---|---|
| GAF E735 ™ | NVP/VA copolymer, 70 wt % NVP |
| GAF E535 ™ | NVP/VA copolymer, 50 wt % NVP |
| GAF E335 ™ | NVP/VA copolymer, 30 wt % NVP |
| K-15 | NVP homopolymer, Mv = 8000 |
| K-30 | NVP homopolymer, Mv = 38000 |
| K-90 | NVP homopolymer, Mv = 630000 |

(all supplied as 50% w/w solutions in ethanol by International Specialty Products Inc., Wayne N.J.)

Each formulation was knife coated on PET as described in Example 3, dried at 60° C. for 5 minutes, washed in cold water for 1 minute, then redried at 60° C. Examination of the resulting coatings by SEM gave the following results:

| Test Polymer | Typical Pore Size (μm) | Pore Density (mm$^{-2}$) |
|---|---|---|
| GAF E735 ™ | 0.2–0.4 | 1.2 × 10$^6$ |
| GAF E535 ™ | 0.8–2.5 | 0.1 × 10$^6$ |
| GAF E335 ™ | no pores | no pores |
| K-15 | 1.2–4.0 | 0.2 × 10$^6$ |
| K-30 | 2.4–4.5 | 0.01 × 10$^6$ |
| K-90 | 0.3–0.5 | 2.0 × 10$^6$ |

Only the GAF E335™ failed to produce a microporous coating. This may have been because its high vinyl acetate content (70%) rendered it insufficiently water-soluble. Alternatively, it may have formed a homogeneous blend with the Butvar™ B-76.

Example 5

This example illustrates the use of PMMA, VYNS™ and cellulose acetate butyrate as the hydrophobic polymer component.

The test polymer (PMMA or VYNS™) (2.5 g) was dissolved in MEK (23 g) and mixed with GAF E735™ (10 g) and further ethanol (5 g). The resulting solutions were knife coated on PET as in Example 3, dried 3 minutes at 40° C., washed in water at 15° C. for 30 seconds, then redried at 40° C. for 3 minutes. Examination by SEM revealed that both coatings were microporous, with the average pore size for the VYNS™ coating being 1–2 μm, and for the PMMA coating, 5 μm or greater.

Test images were printed on these coatings using an Epson 800 ink jet printer and the aqueous inks supplied with it. The VYNS gave good quality, rapid drying images, and had a similar performance to Butvar™ B-76 coatings made by the same process. However, the larger pores in the PMMA coating led to excessive image spread.

When the same process was repeated using CAB 381-20 as the hydrophobic polymer, it proved to be insufficiently soluble in the MEK/ethanol mixture. However, by substituting propyl acetate for the MEK, a stable solution was obtained, and a microporous coating was formed by the same method as before.

Example 6

This example illustrates the hardening effect of a 1,4-dihydropyridine additive.

Butvar™ B-76 (3.4 g) was dissolved in MEK (30 g), and to the resulting solution was added varying quantities of Compound (1). After stirring until all the additive had dissolved, GAF E735™ (13.4 g) and ethanol (3.2 g) were added and stirring continued until the mixture became homogeneous. Knife coating on PET (as described in Example 3), followed by drying (5 minutes at 60° C.), washing (1 minute under cold running distilled water) and redrying (5 minutes at 60° C.) gave a series of microporous coatings containing Compound (1) in amounts ranging from 0–20% by weight of the Butvar™ B-76.

The coatings containing Compound (1) were noticeably harder and more abrasion-resistant than those without, e.g., they were more difficult to scratch with a sharpened tool. SEM analysis revealed a complex relationship between pore size/pore density and the content of Compound (1). At very low (2.5%) and very high (20%) loadings, high densities of very small (<0.1 μm) pores were observed, while at intermediate loadings (5–10%), smaller numbers of larger pores were observed.

For ink jet imaging, the optimum loading of Compound (1) was found to be about 4% by weight of the Butvar™ B-76, giving a tough coating with a high concentration pores of diameter less than 1.0 μm, together with smaller numbers of larger pores, of diameter 1–3 μm.

Example 7

This example illustrates the use of a chemical crosslinking agent.

Three solutions were prepared, each comprising Butvar™ B-76 (5 g) and MEK (45 g), to which were added 0, 0.015 and 0.03 g of 4,4'-methylenebis(phenyl isocyanate), followed by (respectively) 0, 2 and 3 drops of a 1% w/w solution of dibutyl tin dilaurate in MEK. After stirring at room temperature for 1 hour, GAF E735™ (20 g) and ethanol (5 g) were added, and mixing continued a further 30 minutes. The resulting clear solutions were knife coated on PET at 200 μm wet thickness, dried for 5 min at room temperature and 5 min at 60° C., then fed through an automated photographic processor containing distilled water in each of its three processing tanks (residence time per tank—15 seconds). Finally, the resulting microporous coatings were dried at 60° C.

The coatings to which the isocyanate crosslinker had been added were much glossier in appearance, and were significantly harder, more abrasion resistant, and more strongly adhered to the PET support. SEM analysis revealed that another effect of the crosslinker was to provide a higher density of smaller, more uniform pores.

Example 8

This example illustrates the preparation of a microporous film on a nonporous support, optimized for aqueous ink jet printing.

A mixture of Butvar™ B-76 (1 g), Aerosil™ OX50 (4 g), Disperbyk™ 161 (0.04 g) and MEK (29 g) was milled (McCrone Micronising Mill) for 4 hours. An aliquot of the resulting dispersion (8.51 g) was combined with a solution of Butvar™ B-76 (4.75 g) in MEK (37.75 g) and mixed for 15 minutes before adding 4,4'-methylenebis(phenyl isocyanate) (0.03 g) and 3 drops of a 1% w/w solution of dibutyl tin dilaurate in MEK and stirring for a further 60 minutes. GAF E735™ (20 g), ethanol (4.85 g) and water (0.15 g) were added, and stirring continued for 30 minutes. N-methylperfluorooctanesulfonamide (0.2 g) and EFKA-30 (0.05 g) were added, and the mixture knife coated, dried, washed and redried as described in the previous example.

When imaged by an Epson 800 ink jet printer using aqueous inks, bright, high density images were obtained that dried within seconds, resisted wiping with a wet tissue, and comprised sharp, round, well-resolved dots. Identical printing of nonporous commercial ink jet receptors, such as Kodak™ 899 2232, and Hewlett-Packard Premium Quality Ink Jet Paper, gave images of similar quality, but which required at least 4 minutes to dry. Identical printing of porous commercial ink jet receptors, such as Epson™ Photo Quality Glossy Film and Canon™ Glossy paper (which are believed to comprise microporous coatings consisting largely of inorganic materials) also gave high quality images, but still required at least 1 minute to dry.

Example 9

This example illustrates the preparation of a microporous film on a nonporous support, optimized for nonaqueous ink jet printing.

Aerosil™ OX50 (5.0 g), Disperbyk™ 161 and MEK (29.0 g) were milled for 4 hours (McCrone Micronising Mill), and 8.5 g of the resulting dispersion mixed with Butvar™ B-76 (5.0 g) and MEK (38.5 g). After the polymer had dissolved, Compound (1) (0.2 g) was added and dissolved, followed by GAF E735™ (20.0 g) and ethanol (5.0 g). After mixing for 30 minutes, EFKA-30 (0.1 g) and N-methylperfluorooctylsulfonamide (0.2 g) were added, and the mixture coated on PET, dried, washed and redried as described in the previous example.

Samples of the resulting image accepting member were printed using a drum-based printer addressed by a Xaar shared-wall printhead capable of delivering multiple droplets per pixel, operating at 360 dpi (2 minutes per A4 sheet) with its proprietary oil-based inks. Single-, two-, three- and four-color overprint images were printed over 8 levels (i.e., 0–7 droplets per pixel). The images dried rapidly, showed excellent resolution with sharp, round dots, and were abrasion resistant. The number of ink droplets per pixel that could be absorbed before saturation set in was 7, 6, 4, and 2 respectively for 1-, 2-, 3-, and 4-color images.

For comparison, similar images were printed on a variety of commercially-available receptors. Folex Folajet™ Micropore receptor, even though it has porous properties, gave severe image spread and flooded badly. Epson™ Photo Quality Glossy Film and Canon™ Glossy paper (which are believed to comprise microporous coatings consisting largely of inorganic materials) gave sharp images, but could not absorb the oily ink base, and had no resistance to abrasion, even after several days. Formula 1™ Colour 110 Inkjet Paper (supplied by Formula 1, East Grinstead, W. Sussex, UK) absorbed the inks rapidly, but with smearing and strike-through at the higher ink levels. The images were matt, of low density, easily damaged, and of poor quality (with jagged, uneven dots).

Example 10

To a solution of Butvar™ B-76 (10 g) in MEK (90 g) was added GAF E735™ (40 g) and ethanol (10 g). After mixing for 30 minutes, EFKA-30 (0.1 g) was added, and the mixture knife coated at 200 μm wet thickness on Teslin™ microporous sheet (approx. 300 μm thick). Drying (50°/3mins) followed by a 30 second wash in distilled water at 15° C. and redrying (50°/3mins), left a glossy microporous film on the Teslin™ support. (The 60° gloss was recorded as 54, compared to 15 for the bare Teslin™ sheet.)

The same process was also carried out using Melinex™ ST535 (a nonporous polyester film supplied by ICI) as the support. Analysis of the microporous coating by SEM revealed a high density (approx. $10^6/mm^2$) of pores of average diameter approx. 0.5–0.7 μm. The weight loss from the aqueous wash was consistent with a porosity of about 60% by volume in the final product.

Test images were printed on both the coated and uncoated Teslin™ sheet using an Epson Photo Stylus™ printer and aqueous inks (360 dpi, 4 minutes per A4 sheet). Both images dried almost instantaneously, and were printed at 15 levels without flooding. However, as shown by the results in the following table, the coated sheet provided a much higher reflection optical density (ROD) for a given quantity of ink deposited, and the density continued to increase over at least 14 levels, whereas the uncoated sample reached Dmax at 11 levels.

| | Magenta ROD | | Cyan ROD | |
|---|---|---|---|---|
| Step | Uncoated (c) | Coated | Uncoated (c) | Coated |
| 1 | 0.298 | 0.363 | 0.345 | 0.288 |
| 2 | 0.343 | 0.490 | 0.415 | 0.380 |
| 3 | 0.368 | 0.577 | 0.453 | 0.503 |
| 4 | 0.380 | 0.693 | 0.493 | 0.540 |
| 5 | 0.403 | 0.809 | 0.521 | 0.645 |
| 6 | 0.432 | 0.922 | 0.538 | 0.749 |
| 7 | 0.497 | 1.098 | 0.555 | 0.825 |
| 8 | 0.541 | 1.223 | 0.554 | 0.899 |
| 9 | 0.578 | 1.278 | 0.560 | 0.960 |
| 10 | 0.603 | 1.338 | 0.560 | 1.002 |
| 11 | 0.615 | 1.371 | 0.568 | 1.043 |
| 12 | 0.616 | 1.444 | 0.567 | 1.118 |
| 13 | 0.614 | 1.502 | 0.566 | 1.195 |
| 14 | 0.597 | 1.510 | 0.577 | 1.272 |
| 15 | 0.575 | 1.490 | 0.601 | 1.341 |

(c) - control, not in accordance with the invention

Furthermore, the image on the coated Teslin™ sheet was unaffected by rubbing with wet cotton wool, whereas the image on the bare Teslin™ sheet was wiped off immediately by such treatment. On immersion in water for 30 seconds, the image on the coated Teslin™ sheet suffered on slight loss of image density (<10%), and this could be reduced almost to zero by heat sealing the image at 60° C. for 10 seconds. Regardless of heat treatment, the image on the bare Telsin™ sheet suffered catastrophic loss of density on such treatment.

Example 11

Butvar™ B-76 (17.5 g) was dissolved in MEK (157.5 g) and 26 g aliquots of this solution were mixed with GAF E735™ (10 g), methanol (2.5 g), distilled water (2 drops), EFKA-30 (0.025 g), and varying amounts of fluorocarbon-based levelling agent (N-methylperfluorooctylsulfonamide) and/or hardener (Compound (1)). The resulting solutions were knife coated on Teslin™ sheet at 150 μm wet thickness, then dried, washed and redried as described in Example 1. The resulting microporous coatings (A–D) were glossy in appearance, with gloss increasing as the content of N-methylperfluorooctylsulfonamide increased.

Coatings A–D, along with bare Teslin™ sheet as control, were imaged using a drum-based printer addressed by a Xaar™ shared-wall printhead capable of delivering multiple droplets per pixel, operating at 360 dpi (2 minutes per A4 sheet) with its proprietary oil-based inks. Test images in 1, 2, 3, and 4 colors were printed at up to 12 levels (i.e., 0–11 ink droplets per pixel), and the number of droplets per pixel that could be absorbed without saturating the receptor are recorded in the following table, where "FC" refers to the content of N-methylperfluorooctylsulfonamide (as wt % of the Butvar™ B-76 content), and "hardener" similarly refers to the content of Compound (1):

| Coating | FC (%) | Hardener (%) | Droplets per Pixel | | | |
|---|---|---|---|---|---|---|
| | | | 1 color | 2 color | 3 color | 4 color |
| A | — | — | 11 | 7 | 7 | 5 |
| B | 8 | — | 11 | 8 | 6 | 5 |
| C | 4 | 4 | 11 | 8 | 6 | 5 |
| D | 8 | 4 | 11 | 10 | 10 | 9 |
| control | | | 11 | 11 | 11 | 11 |

Unmodified Teslin™ sheet is clearly outstanding in its ability to absorb oil-based inks, but its excessively matt appearance restricts its utility as an image receptor. Furthermore, its rough texture gives rise to image dots that are jagged and uneven, which gives the overall image of a mottled appearance. The above results show that the image accepting elements in accordance with the invention (and coating D in particular) retain most of the ink absorption capability of bare Teslin™ sheet, but at the same time are glossy in appearance. Furthermore, the image dots deposited thereon are round and even, and do not give rise to mottle.

For comparison, similar images were printed on a variety of commercially-available receptors. Nonporous receptors designed for use with aqueous inks, such as Hewlett-Packard Premium Quality Ink Jet Paper, were not wetted by the inks and failed to give useful images. Folex Folajet™ Micropore receptor, even though it has porous properties, gave severe image spread and flooded badly. Epson™ Photo Quality Glossy Film and Canon™ Glossy paper (which are believed to comprise microporous coatings consisting largely of inorganic materials) gave sharp images, but could not absorb the oily ink base, and had no resistance to abrasion, even after several days. Formula 1™ Colour 110 Inkjet Paper (supplied by Formula 1, East Grinstead, W. Sussex, UK) absorbed the inks rapidly, but with smearing and strike-through at the higher ink levels. The images were matt, of low density, easily damaged, and of poor quality (with jagged, uneven dots).

Further samples of coatings A–D were imaged using the Epson Photo Stylus™ printer (360 dpi, 3 min/A4 sheet) and aqueous inks. Three-color (R, G, B) test patterns were printed, and the image quality and substantivity assessed. All the images were touch dry essentially instantaneously, and were of good, even quality, except for those with the higher level (8%) of fluorocarbon, which showed some repellency towards the aqueous inks. The image on the Teslin™ control was dull and of low density. Soaking the images in distilled water for 30 sec caused approximately 5% loss in density for coatings A and B, no loss in density for coatings C and D, but 85% loss for the control.

Thus, it was demonstrated that image accepting members in accordance with the invention were compatible with both aqueous and nonaqueous inks.

Example 12

This example illustrates the beneficial interactions between microporous poly(vinyl butyral) films prepared by the method of the invention and solvents commonly used in oil-based inks.

To a solution of Butvar™ B-76 (2.5 g) in MEK (22.5 g) was added GAF E735™ (10.0 g), and the mixture was knife coated (150 µm wet thickness) on PET, dried at 60° C. for 3 min, washed in cold water for 30 seconds, and dried again at 60° C. to provide Receptor A by the method of the invention.

Test images were printed on this material using a Codent piezoelectric printhead and a cyan ink comprising approximately 5 wt % pigment, 2 wt % resin binder and 93 wt % Coasolm (a mixture of the isobutyl esters of adipic, glutaric and succinic acids supplied by Chemoxy International). Identical images were also printed on the following commercially available nonporous receptors: Kodak™ 899 2232 and Hewlett-Packard Premium Quality Ink Jet Paper, and on the following microporous receptors: Epson™ Photo Quality Glossy Film, Canon™ Glossy Paper, Formula 1™ Colour 110 Inkjet Paper, and Teslin™ sheet. The nonporous Kodak and Hewlett-Packard receptors were not wetted by the ink, and gave very poor images. All the microporous receptors imaged successfully, and the images were tested for durability. The durability tests consisted of wiping with cotton wool (both wet and dry), and finger rubbing. The image on Receptor A passed all three tests, whereas the images on the commercial receptors failed all three tests, except for that on the Formula 1™ paper, which survived the dry wipe but failed the other two tests.

Examination of the imaged surfaces by interferometry (by means of a Zygo New View™ Interferometric Microscope, supplied by Zygo Corp., Middlefield, Conn.) revealed that the dots constituting the images on the Epson and Canon receptors lay proud of the surface, and hence were easily damaged. In contrast, the dots on Receptor A lay at the bottom of pits or depressions approximately 2.5 µm deep, and hence were protected from physical damage. The surfaces of the Teslin™ and Formula 1™ receptors were too rough to allow the position of the dots to be determined in this way, but it is likely that dots (or parts of dots) residing on the "peaks" of the surface are susceptible to physical damage.

Further tests were carried out using Receptor B, which was prepared in identical fashion to Receptor A, except that silica (Syloid™ ED74) at a loading of 11% by weight of the Butvar™ B-76 was dispersed in the coating formulation prior to addition of the GAF E735™. Test images were jetted onto this material using "inks" that consisted entirely of carrier solvents of varying polarity. These comprised varying proportions of Exxsol™ D 140 (an aliphatic hydrocarbon) and Novol™ (oleyl alcohol), believed to be the major constituents of several commercially available inks. The compositions varied from pure Exxsol™ D 140 to a 1:1 w/w mixture of the two. Although no pigments were present, all the compositions except pure Exxsol™ D140 visibly marked the surface of the receptor. Further examinations by optical microscopy, SEM, and interferometry revealed the following:

| Solvent Ratio * | Visual Inspection | Optical Microscopy | SEM | Interferometry |
|---|---|---|---|---|
| 1:0 | no marking | n/a | n/a | n/a |
| 10:1 | marking | merged dots | no swelling | no pits |
| 8:1 | marking | merged dots | no swelling | no pits |
| 6:1 | marking | merged dots | swelling | no pits |
| 4:1 | marking | individual dots | swelling | no pits |

-continued

| Solvent Ratio * | Visual Inspection | Optical Microscopy | SEM | Interferometry |
|---|---|---|---|---|
| 2:1 | marking | individual dots | swelling | 1.5 μm pits |
| 1:1 | marking | individual dots | swelling | 3.0 μm pits |

* - hydrocarbon/oleyl alcohol, w/w
n/a - not tested

The degree of swelling of the poly(vinyl butyral) film observed by SEM, and the propensity for pit formation, increased markedly as the proportion of the more polar solvent oleyl alcohol increased, as did the resolution of the image dots. From these results, it can be concluded that formation of pits in the film is an extreme manifestation of swelling whereby the polymer not only imbibes, but partially dissolves in the ink solvent, causing a local collapse of the porous matrix. It is reasoned that this interaction enables the dyes or pigments present in "real" inks to become encapsulated in the polymer and/or be placed at the bottom of pits or depressions, and hence protects the image against physical damage.

What is claimed is:

1. A method for manufacturing a microporous film comprising the steps of:
   (a) providing a first polymer which is a hydrophobic thermoplastic polymer and a second polymer which is a hydrophilic polymer or copolymer of N-vinylpyrrolidone;
   (b) dissolving said first and second polymers in a solvent system which is compatible with both polymers, said solvent system comprising a blend of an aprotic organic solvent and an alcohol;
   (c) coating the resulting solution on a support;
   (d) effecting at least a partial drying of the resulting coating; and
   (e) washing the coating in an aqueous medium so as to extract at least 50% by weight of the said second polymer.

2. The method of claim 1 wherein said first polymer is selected from the group consisting of vinyl polymers; acrylate and methacrylate polymers; cellulose esters; polyethers; polyesters; and polycarbonates.

3. The method of claim 1 wherein said first polymer comprises pendant hydroxyl groups and has a hydroxyl number of at least 300.

4. The method of claim 1 wherein said second polymer is selected from the group consisting of homopolymers of N-vinylpyrrolidone and copolymers of N-vinylpyrrolidone and vinyl acetate comprising up to 50% by weight vinyl acetate.

5. The method of claim 1 wherein the weight ratio of said first and second polymers is in the range 2:1–1:3.

6. The method of claim 1 wherein said aprotic organic solvent has a boiling point of less than 120° C. at normal atmospheric pressure.

7. The method of claim 1 wherein said aprotic organic solvent is selected from the group consisting of ketones; ethers; esters; and hydrocarbons and wherein said alcohol is selected from the group consisting of methanol, ethanol, 1-propanol, 2-propanol and mixtures of these.

8. The method of claim 1 wherein the weight ratio of aprotic solvent to alcohol is in the range 30:1 to 1:2.

9. The method of claim 1 wherein the aqueous medium of step (e) contains one or more functional materials selected from the group consisting of surfactants, mordents, UV absorbers and antioxidants.

10. The method of claim 1 wherein one or more ingredients selected from the group consisting of particulate fillers, chemical modifiers, crosslinking agents, hardeners, leveling agents, surfactants, UV absorbers, antioxidants, free radical scavengers and mordents is added to the solution formed in step (b) prior to the coating thereof.

11. An imaging method wherein an ink comprising a colorant in a carrier fluid is imagewise deposited on a microporous film made by a method comprising the steps of:
   (a) providing a first polymer which is a hydrophobic thermoplastic polymer and a second polymer which is a hydrophilic polymer or copolymer of N-vinvlpyrrolidone;
   (b) dissolving said first and second polymers in a solvent system which is compatible with both polymers, said solvent system comprising a blend of an aprotic organic solvent and an alcohol;
   (c) coating the resulting solution on a support;
   (d) effecting at least a partial drying of the resulting coating; and
   (e) washing the coating in an aqueous medium so as to extract at least 50% by weight of the said second polymer.

12. The imaging method of claim 11 wherein said image is deposited by ink jet printing.

13. The imaging method of claim 12 wherein said ink jet printing uses oil-based inks.

14. The imaging method of claim 12 wherein said ink jet printing is multilevel ink jet printing, employing the technique of jetting a normal density ink and a lower density ink of the same color from separate printheads, or the technique of delivering multiple droplets of ink per pixel, or a combination of both of these techniques.

15. The imaging method of claim 14 wherein said ink jet printing is carried out by means of a piezoelectric shared-wall printhead.

16. The imaging method of claim 12 wherein the microporous film swells or distorts as a result of contact with said carrier liquid.

* * * * *

UNITED STATES PATENT AND TRADEMARK OFFICE
CERTIFICATE OF CORRECTION

PATENT NO. : 6,689,421 B2
DATED : February 10, 2004
INVENTOR(S) : Ranjan Chhaganbhai Patel et al.

It is certified that error appears in the above-identified patent and that said Letters Patent is hereby corrected as shown below:

<u>Title page,</u>
Item [75], Inventors, after "Parsons,"delete "Herts" and replace it with -- Bishops Stortford -- after "Spence," delete "Herts"and replace it with -- Ware -- ; after "Lindsay,"delete "Herts" and replace it with -- Furneux Pelham --
Item [73], Assignee, delete "Graphics, Inc." and replace it with -- Graphics LLC --
Item [62], Related U.S. Application Data, delete "abandoned."and replace it with -- abandoned, which claims priority to European Patent Application No. 98103969.6, filed on Mar. 6, 1998. --

<u>Column 24,</u>
Line 26, delete the word "vinvlpyrrolidone" and replace it with -- vinylpyrrolidone --

Signed and Sealed this

Eighteenth Day of May, 2004

JON W. DUDAS
*Acting Director of the United States Patent and Trademark Office*